United States Patent
Majmudar et al.

(10) Patent No.: US 8,701,412 B2
(45) Date of Patent: Apr. 22, 2014

(54) SYSTEM FOR RECOVERING HEAT FROM A BIOMASS GASIFIER

(75) Inventors: Jinmesh Pranav Majmudar, Ahmedabad (IN); Omprakash Mall, Orissa (IN); Lakshmanan Subramanian, Trichy (IN); Avish Ivan Dsouza, Bangalore (IN)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 13/190,425

(22) Filed: Jul. 25, 2011

(65) Prior Publication Data
US 2013/0025279 A1 Jan. 31, 2013

(51) Int. Cl.
*F01K 17/00* (2006.01)
*F01K 25/06* (2006.01)
*F02G 1/00* (2006.01)
*F01K 23/06* (2006.01)
*F01K 13/00* (2006.01)

(52) U.S. Cl.
USPC ............... 60/645; 60/670; 60/648; 60/650; 60/649

(58) Field of Classification Search
USPC .......... 60/682, 645–681, 39.5–39.52; 34/60, 34/86
See application file for complete search history.

(56) References Cited

U.S. PATENT DOCUMENTS

| | | | | |
|---|---|---|---|---|
| 5,253,432 A | * | 10/1993 | Raiko et al. | 34/514 |
| 5,485,728 A | * | 1/1996 | Dickinson | 60/648 |
| 6,103,944 A | * | 8/2000 | Blake et al. | 570/165 |
| 6,182,584 B1 | * | 2/2001 | Gaudio | 110/229 |
| 6,574,962 B1 | * | 6/2003 | Hsu | 60/649 |
| 6,647,903 B2 | | 11/2003 | Ellis | |
| 7,827,776 B2 | * | 11/2010 | Moore et al. | 60/39.12 |
| 2008/0028631 A1 | * | 2/2008 | Leahy | 34/82 |
| 2009/0133407 A1 | * | 5/2009 | Sawyer | 60/780 |
| 2009/0217584 A1 | * | 9/2009 | Raman et al. | 48/127.7 |
| 2010/0071262 A1 | * | 3/2010 | Robinson et al. | 48/127.7 |

FOREIGN PATENT DOCUMENTS

EP 1203802 A1 8/2002

* cited by examiner

*Primary Examiner* — Kenneth Bomberg
*Assistant Examiner* — Deming Wan
(74) *Attorney, Agent, or Firm* — Fletcher Yoder P.C.

(57) ABSTRACT

Systems for recovering heat from a biomass gasifier are provided. One gasification system includes a gasifier having an inlet section configured to receive a biomass feedstock and air, and a reactor section configured to gasify a mixture of the biomass feedstock and the air to generate a producer gas. The gasifier also has an outlet section configured to output the producer gas from the reactor section. The gasification system also includes a heat exchanger system coupled to the gasifier. The heat exchanger system is configured to recover heat from the gasifier by transferring heat to a fluid to create a heated fluid.

12 Claims, 3 Drawing Sheets

SYSTEM FOR RECOVERING HEAT FROM A BIOMASS GASIFIER

BACKGROUND OF THE INVENTION

The subject matter disclosed herein relates generally to gasification systems, and more particularly, to systems for recovering heat from a biomass gasifier.

Biomass may be gasified for use in the production of electricity, chemicals, synthetic fuels, or for a variety of other applications. Biomass gasification often involves incomplete combustion of biomass, resulting in production of combustible gases including carbon monoxide (CO), hydrogen ($H_2$) and traces of methane ($CH_4$), or in other words, producer gas. Producer gas can be used to run internal combustion engines, for example as a substitute for furnace oil, and can also be used to produce methanol, oxo-chemical, etc. However, the producer gas produced by the biomass gasifier often needs to be cooled and cleaned before being used. During the cleaning and cooling processes, some thermal energy may be unused, resulting in wasted energy. Therefore, a system that decreases the amount of unused thermal energy may be desirable.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a gasification system includes a gasifier having an inlet section configured to receive a biomass feedstock and air, and a reactor section configured to gasify a mixture of the biomass feedstock and the air to generate a producer gas. The gasifier also has an outlet section configured to output the producer gas from the reactor section. The gasification system also includes a heat exchanger system coupled to the gasifier. The heat exchanger system is configured to recover heat from the gasifier by transferring heat to a fluid to create a heated fluid.

In a second embodiment, a gasification system includes a gasifier having an inlet section configured to receive a biomass feedstock and air, and a reactor section configured to gasify a mixture of the biomass feedstock and the air to generate a producer gas. The gasifier also includes an outlet section configured to output the producer gas from the reactor section. The gasification system also includes a heat exchanger system coupled to the outlet section of the gasifier. The heat exchanger system is configured to recover heat from the gasifier by transferring heat to a fluid to create a heated fluid.

In a third embodiment, a gasification system includes a gasifier having an inlet section configured to receive a biomass feedstock and air, and a reactor section configured to gasify a mixture of the biomass feedstock and the air to generate a producer gas. The gasifier also includes an outlet section configured to output the producer gas from the reactor section and an ash extraction system configured to receive hot ash from the reactor section. The gasification system also includes a heat exchanger system coupled to the ash extraction system of the gasifier. The heat exchanger system is configured to recover heat from the gasifier by transferring heat from the hot ash in the ash extraction system to a fluid to create a heated fluid for generating electrical power or for use in any other thermal application as required.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to gasification systems configured to recover heat from a biomass gasification process. The gasification systems described herein employ heat exchangers for recovering heat from the producer gas flowing through a gasifier outlet or from an ash extraction system. The heat exchangers may transfer the recovered heat to another system. For example, the heat from the ash in the gasifier ash extraction system may be used to heat water for a steam driven system. In another example, the heat from the producer gas flowing through the gasifier outlet may be used to heat a fluid that is part of a vapor absorption machine. In addition, the extraction of heat from the producer gas may cool the producer gas, thereby decreasing the amount of cooling needed from a cooling system to cool the producer gas, which may improve the efficiency of the gasification system. Furthermore, the heat from the producer gas flowing through the gasifier outlet may be used to heat feedstock dryer exhaust.

Figure 1:
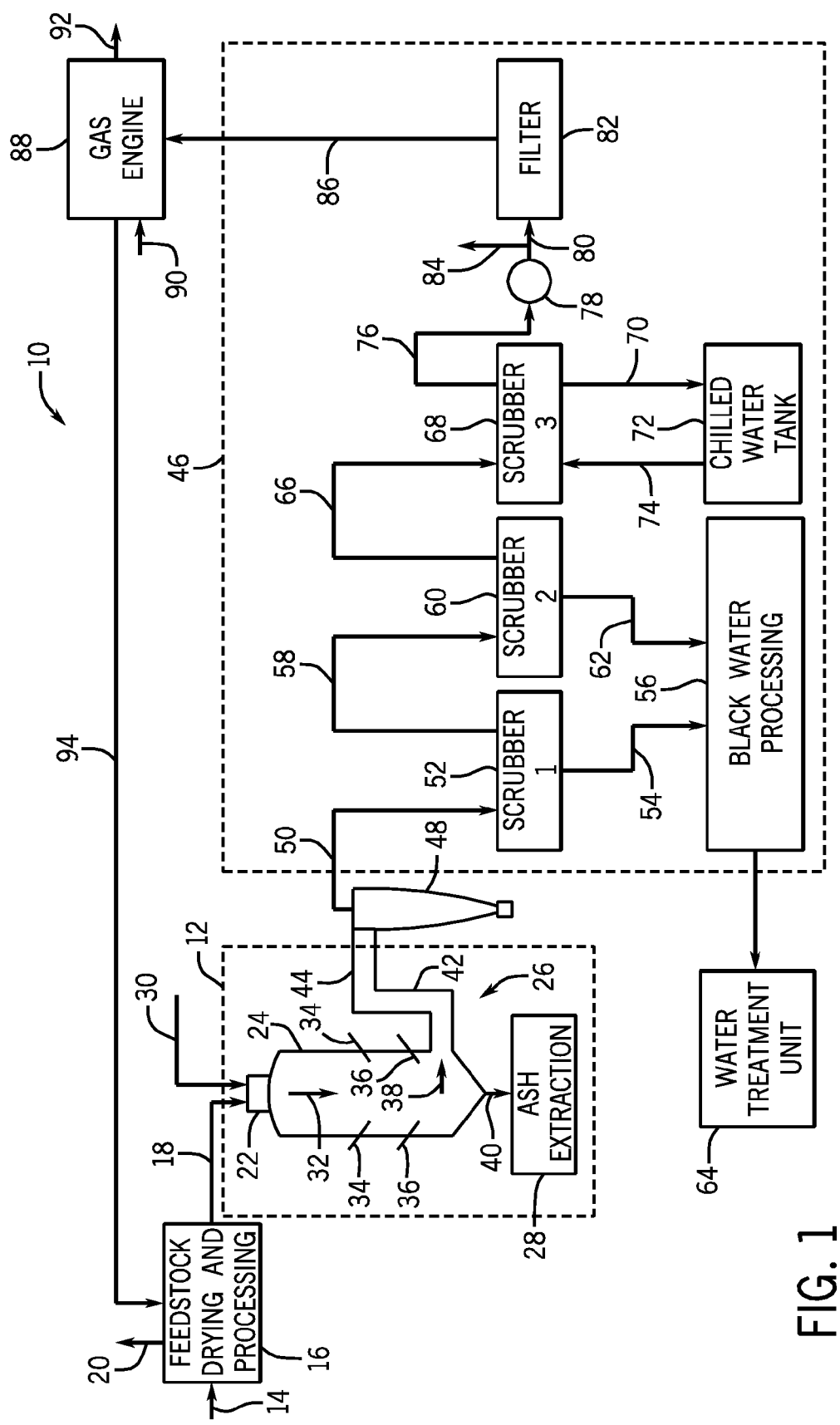
FIG. 1 is a schematic block diagram of an embodiment of a biomass gasification system.

FIG. 1 illustrates a biomass gasification system 10 that may recover heat from a biomass gasifier 12. Within the biomass gasification system 10, a biomass fuel source 14 may be utilized as a source of energy to create producer gas. The biomass fuel source 14 may include alfalfa straw, bean straw, barley straw, coconut shell, coconut husks, corn cobs, corn fodder, cotton stalks, peach pits, peat, prune pits, rice hulls, safflower, sugarcane, walnut shell, what straw, wood blocks, wood chips, bagasse, or other biomass materials.

The biomass fuel source 14 may be introduced into the biomass gasification system 10 via a feedstock drying and processing system 16. The feedstock drying and processing system 16 may resize or reshape the biomass fuel source 14, for example, by chopping, milling, shredding, pulverizing, briquetting, or palletizing the biomass fuel source 14. The resized or reshaped biomass fuel source 14 may be dried to create a dry feedstock 18. Further, the feedstock drying and processing system 16 may emit a dryer exhaust 20 as part of the drying process. In certain embodiments, the feedstock drying and processing system 16 may include a grinding mill.

The dry feedstock 18 may be directed into the biomass gasifier 12. The biomass gasifier 12 includes an inlet 22, a reactor 24, an outlet 26, and an ash extraction system 28. The dry feedstock 18 and air 30 enter the biomass gasifier 12 through the inlet 22. The dry feedstock 18 is mixed with the air 30 in the reactor 24 of the biomass gasifier 12. Gravity assists to move the dry feedstock 18 towards the lower section of the reactor 24, as illustrated by arrow 32. As the dry feedstock 18 moves through the reactor 24, additional air may enter the reactor 24 through openings 34 and 36 located on the body of the reactor 24. The dry feedstock 18 is gasified within the reactor 24 to create producer gas.

In particular, the dry feedstock 18 may be combusted with a limited amount of oxygen (e.g., partial oxidation) at elevated pressures (e.g., from absolute pressures of approximately 0.1 bar to 85 bar) and elevated temperatures (e.g., approximately 700° C. to 1600° C.) to partially oxidize the dry feedstock 18 and create producer gas. Due to chemical reactions between the air 30, steam, and carbon within the dry feedstock 18, the producer gas may include hydrogen, carbon monoxide, carbon dioxide, water vapor, and methane, as well as other less desirable components, such as ash, dust, tar, and nitrogen.

Partial oxidation occurs in the biomass reactor 24. As part of the partial oxidation, the dry feedstock 18 may be heated to undergo a pyrolysis process. According to certain embodiments, temperatures inside the biomass reactor 24 may range from approximately 150° C. to 700° C. during the pyrolysis process, depending on the type of biomass fuel source 14 utilized, to generate the dry feedstock 18. The heating of the feedstock 18 during the pyrolysis process may generate a solid (e.g., char) and residue gases (e.g., carbon monoxide, and hydrogen).

A combustion process may then occur in the biomass reactor 24. The combustion may include introducing an oxidant to the char and residue gases. The char and residue gases may react with the oxidant to form carbon dioxide and carbon monoxide, which provides heat for the subsequent gasification reactions. According to certain embodiments, temperatures during the combustion process may range from approximately 700° C.° C. to 1600° C. Next, steam may be introduced into the biomass reactor 24 during a gasification step. The char may react with the carbon dioxide to produce carbon monoxide and may react with steam to produce carbon monoxide and hydrogen at temperatures ranging from approximately 800° C. to 1100° C. In essence, the biomass reactor 24 utilizes steam and oxygen to allow some of the feedstock to be "burned" to produce carbon dioxide and energy, which drives a second reaction that converts further feedstock 18 to hydrogen and additional carbon monoxide. In this way, the biomass reactor 24 manufactures a resultant gas.

This resultant gas may include approximately 20% of carbon monoxide, 15% of hydrogen, and 13% of carbon dioxide, as well as some amount of methane, and water vapor. Non-gasifiable ash material and unconverted and/or incompletely converted feedstock 18 may be byproducts of the process.

The producer gas flows to the gasifier outlet 26, as depicted by arrow 38, while the hot ash exits the reactor 24 via the ash extraction system 28, as depicted by arrow 40. The ash extraction system 28 contains the hot ash until it is removed from the biomass gasifier 12. As described in greater detail below, in certain embodiments, a heat exchanger may be placed in the ash extraction system 28 to exchange heat with the hot ash. The producer gas flows to the gasifier outlet 26. When the producer gas enters the gasifier outlet 26, the producer gas may be at a temperature in a range of approximately 300° C. to 500° C., 200° C. to 400° C., or 450° C. to 600° C., depending on the specific operating conditions of the biomass gasifier 12. Specifically, in certain embodiments, when the producer gas enters the gasifier outlet 26, the producer gas may be approximately 450° C. The gasifier outlet 26 includes a first portion 42 (e.g., an upstream portion) and a second portion 44 (e.g., a downstream portion). In certain embodiments, the producer gas flows through the first portion 42 and the second portion 44 of the gasifier outlet 26 to a gas cleaning system 46, which cleans and cools the producer gas. As described in greater detail below, heat exchangers may be placed in the gasifier outlet 26 to extract heat from the producer gas as it flows through the first portion 42 and the second portion 44 of the gasifier outlet 26.

In certain embodiments, the gas cleaning system 46 may include a cyclone separator 48, scrubbers 52, 60, and 68, and other filters interconnected by tubes. The cyclone separator 48 is used to remove dust and other particles in the producer gas. For example, in certain embodiments, the cyclone separator 48 may be used to filter out particles greater than approximately 2, 3, 4, 5, 6, 7, 8, 9, or more micrometers. In certain embodiments, approximately 60 to 65 percent of the producer gas may contain particles greater than 60 micrometers in size. Therefore, the cyclone separator 48 may remove a large number of particles from the producer gas. From the cyclone separator 48, the producer gas flows through a tube 50 to the first scrubber 52. In the first scrubber 52, fines (e.g., fine particles), tar, and other entrained gases, such as hydrogen chloride, may be removed. In particular, within the first scrubber 52, the fines and tar may be separated from the producer gas to produce a stream of black water 54 that may exit a bottom portion of the first scrubber 52, while scrubbed producer gas may exit through an upper portion of the first scrubber 52.

The black water 54 exiting the bottom portion of the first scrubber 52 may be directed to a black water processing system 56. The producer gas exiting the upper portion of the first scrubber 52 flows through tube 58 to the second scrubber 60. In the second scrubber 60, additional fines, tar, and gases may be removed. As with the first scrubber 52, the fines and tar may be separated from the producer gas to produce a second stream of black water 62 that may exit a bottom portion of the second scrubber 60, while scrubbed producer gas may exit through an upper portion of the second scrubber 60.

The black water 62 exiting the bottom portion of the second scrubber 60 may also be directed to the black water processing system 56 and processed similar to the black water 54 exiting the bottom portion of the first scrubber 52. The black water processing system 56 also may include a settling process that produces separated fines and grey water and/or other byproducts. The separated fines may be recycled and used in the feedstock drying and processing system 16, where the fines may be used to provide additional fuel. The grey water and/or any other byproducts from the black water processing system 56 may be directed to a water treatment unit 64 for further processing.

The producer gas exiting the upper portion of the second scrubber 60 flows through a tube 66 to the third scrubber 68 (e.g., a chilled water scrubber). In the third scrubber 68, the producer gas may undergo additional filtering and cooling. For example, chilled water may flow into the third scrubber 68 to exchange heat with the producer gas, thereby cooling the producer gas and warming the water. Specifically, in certain embodiments, the water may flow through a first tube 70 to a chilled water tank 72 where the water is cooled for recirculation. The chilled water then flows through a second tube 74 to repeat the cycle of cooling the producer gas.

For a biomass gasification system 10 that produces megawatts of power, a large amount of energy may be required to cool the producer gas in the third scrubber 68. For example, in certain embodiments, the cooling in the third scrubber 68 may use approximately 250 kW to 300 kW, 300 kW to 400 kW, or 350 kW to 450 kW of energy. Specifically, in certain embodiments, the cooling in the third scrubber 68 may use approximately 350 kW of energy. In certain embodiments, the producer gas may be cooled by using heat exchangers at the gasifier outlet 26. In such embodiments, the amount of energy that the third scrubber 68 uses to cool the producer gas may be reduced. For example, the amount of energy that the third scrubber 68 may use in such an embodiment may be reduced to approximately 125 kW to 150 kW, 150 kW to 200 kW, or 175 kW to 225 kW of energy. Specifically, in certain embodiments, the cooling in the third scrubber 68 may use approximately 175 kW of energy. Furthermore, the energy that the third scrubber 68 uses may be reduced by approximately 20 to 60 percent, 30 to 40 percent, or 35 to 55 percent, for example. Specifically, in certain embodiments, the energy used for cooling in the third scrubber 68 may be reduced by approximately 45%.

From the third scrubber 68, the producer gas then flows through a tube 76 into a suction blower 78. The suction blower 78 is used to move the producer gas from the biomass gasifier 12 and through the gas cleaning system 46. The producer gas flows from the suction blower 78 through a tube 80 into a gas filter 82, which is used to remove small or fine particles from the producer gas. For example, in certain embodiments, the gas filter 82 may remove particles from the producer gas that are smaller than approximately 40 to 90, 50 to 80, or 60 to 75 micrometers. Specifically, in certain embodiments, the gas filter 82 may remove particles from the producer gas that are smaller than approximately 60 micrometers. Some producer gas may flow from the suction blower 78 to a flare 84, which may be used to burn excess producer gas.

The producer gas exits the gas cleaning system 46 through a tube 86 and may flow into a gas engine 88 (e.g., a gas turbine) to be used to produce energy. The gas engine 88 combusts the producer gas with air 90 to produce power 92. The power 92 may then be used to operate other systems and/or the power 92 may be provided to a utility power grid. During combustion, the gas engine 88 produces engine exhaust 94, which may be used to dry feedstock in the feedstock drying and processing system 16. Further, in certain embodiments, the engine exhaust 94 may be combined with exhaust from the heated feedstock drying and processing system 16 and recycled into the feedstock drying and processing system 16.

Figure 2:
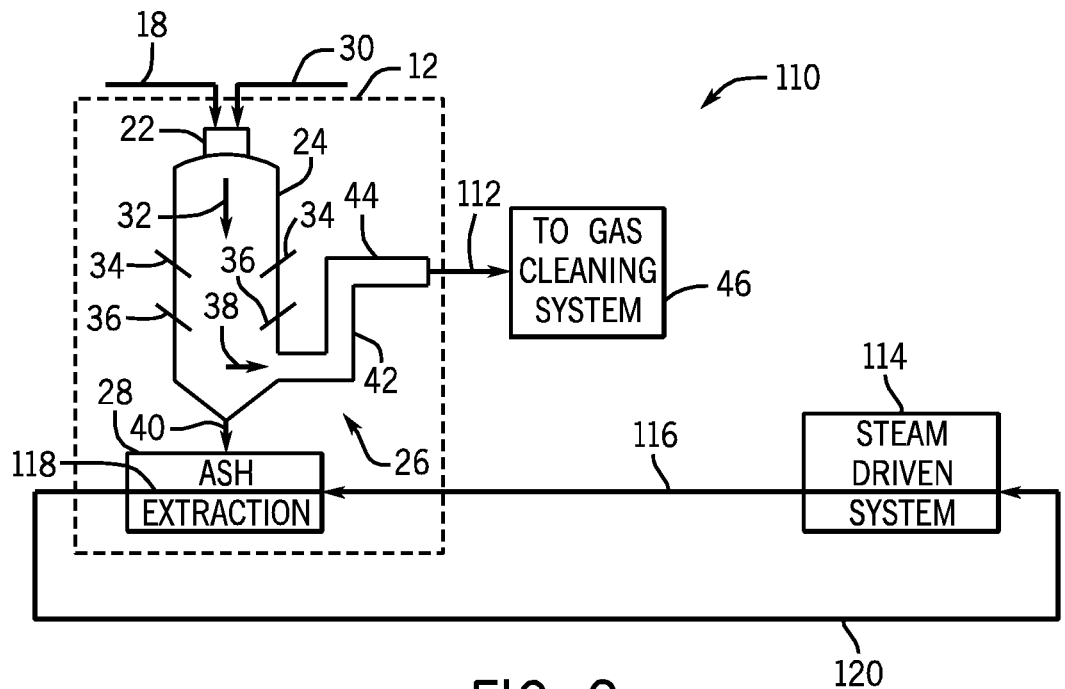
FIG. 2 is a schematic block diagram of an embodiment of a biomass gasifier with a heat recovery system coupled to an ash extraction system of FIG. 1.

As described above, the biomass gasification system 10 of FIG. 1 may include several systems for recovering heat from the biomass gasifier 12. For example, FIG. 2 is a schematic block diagram of an embodiment of the biomass gasifier 12 with a heat recovery system 110 coupled to the ash extraction system 28 of FIG. 1. As described above with respect to FIG. 1, the biomass gasifier 12 combusts the feedstock 18 with air 30 to create producer gas that flows out of the biomass gasifier 12 through the outlet 26. The producer gas exits the biomass gasifier 12 as illustrated by arrow 112 and flows into the gas cleaning system 46. The byproduct hot ash is extracted from the reactor 24 by the ash extraction system 28.

In certain embodiments, a steam driven system 114 uses steam that is produced from water flowing through a heat exchanger in the ash extraction system 28. The steam driven system 114 may be used for driving a steam turbine to produce electrical power, heating purposes such as feed heating, driving a mechanical device, ammonia stripping (e.g., in an ammonia removal unit), water treatment, a vapor absorption machine, moderation, vacuum creation, and so forth. The steam driven system 114 pumps water (e.g., boiler feed water) through a tube 116. The water flows through the tube 116 toward the ash extraction system 28. In certain embodiments, a heat exchanger tube 118 extends through the ash extraction system 28. The heat exchanger tube 118 may directly contact the hot ash and/or otherwise transfer heat from the hot ash into the water flowing through the heat exchanger tube 118. As such, the heat exchanger tube 118 operates as a heat exchanger within the ash extraction system 28. Although depicted as being generally straight, the heat exchanger tube 118 may, in certain embodiments, be coil shaped, or any other shape or configuration used by heat exchangers. Indeed, in certain embodiments, other types of heat exchanger systems may be used inside the ash extraction system 28 to transfer heat from the hot ash to the water. For example, the heat exchanger system may include any type of heat exchanger, such as a tubular heat exchanger, coiled heat exchanger, jacketed heat exchanger, shell and tube heat exchanger, plate heat exchanger, or plate fin heat exchanger.

As described above, as the water flows through the heat exchanger tube 118, the water is heated to produce steam or a combination of hot water and steam. The steam and/or hot water exit the ash extraction system 28 and flows through a tube 120 to return to the steam driven system 114. The steam driven system 114 then uses the steam and/or hot water as a source of energy. While energy is exchanged in the steam driven system 114, the steam/and or hot water may be cooled. As such, the cooled water may repeat the cycle again by flowing through the tube 116 to the ash extraction system 28.

Figure 3:
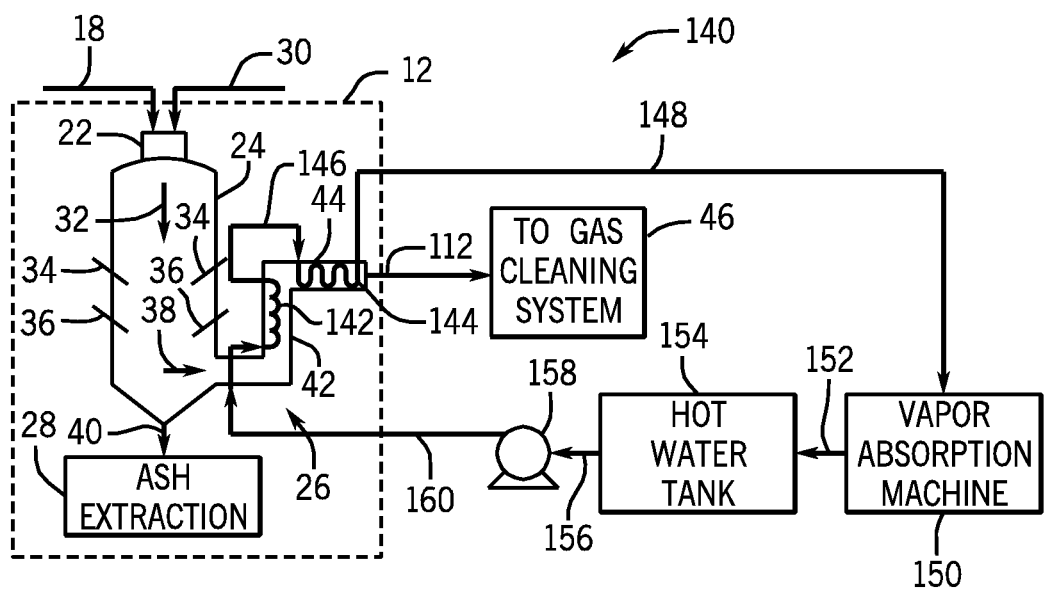
FIG. 3 is a schematic block diagram of an embodiment of a biomass gasifier with a heat recovery system coupled to an outlet of the biomass gasifier of FIG. 1.

FIG. 3 is a schematic block diagram of an embodiment of the biomass gasifier 12 with a heat recovery system 140 coupled to the outlet 26 of the biomass gasifier 12 of FIG. 1. As described above with respect to FIG. 1, the biomass gasifier 12 combusts the feedstock 18 with air 30 to create producer gas that flows out of the biomass gasifier 12 through the outlet 26. The producer gas exits the biomass gasifier 12 as illustrated by arrow 112 and flows into the gas cleaning system 46. The byproduct hot ash is extracted from the reactor 24 by the ash extraction system 28.

In the embodiment illustrated in FIG. 3, a first heat exchanger 142 is located in the first portion 42 of the outlet 26. The first heat exchanger 142 is positioned to enable heat to be transferred from the producer gas to a fluid (e.g., water, or any other suitable fluid) flowing in the first heat exchanger 142, thereby heating the fluid and cooling the producer gas. For example, the producer gas may be at a temperature in a range of approximately 300° C. to 500° C., 200° C. to 400° C., or 450° C. to 600° C. when it enters the first portion 42 of the outlet 26. Specifically, in certain embodiments, when the producer gas enters the first portion 42 of the outlet 26, the producer gas may be approximately 450° C. After transferring heat to the fluid flowing through the first heat exchanger 142, the producer gas may be at a temperature in a range of approximately 200° C. to 400° C., 100° C. to 300° C., or 350° C. to 500° C. Specifically, in certain embodiments, after transferring heat to the fluid flowing through the first heat exchanger 142, the producer gas may be approximately 300° C.

In addition, in certain embodiments, a second heat exchanger 144 is located in the second portion 44 of the outlet 26. The second heat exchanger 144 is positioned to enable heat to be transferred from the producer gas to a fluid (e.g., water, or any other suitable fluid) flowing in the second heat exchanger 144, thereby heating the fluid and cooling the producer gas. For example, the producer gas may be at a temperature in a range of approximately 200° C. to 400° C., 100° C. to 300° C., or 350° C. to 500° C. when it enters the second portion 44 of the outlet 26. Specifically, in certain embodiments, when the producer gas enters the second portion 44 of the outlet 26, the producer gas may be approximately 300° C.

Furthermore, after transferring heat to the fluid flowing through the second heat exchanger 144, the producer gas may be at a temperature in a range of approximately 100° C. to 300° C., 75° C. to 200° C., or 250° C. to 400° C. when it exits the second portion 44 of the outlet 26. Specifically, in certain embodiments, after transferring heat to the fluid flowing through the second heat exchanger 144, the producer gas may exit the second portion 44 of the outlet 26 at approximately 200° C. As such, after flowing through the first and second heat exchangers 142 and 144, the fluid may exit the second heat exchanger 144 at a temperature in a range of approximately 80° C. to 150° C., 60° C. to 100° C., or 120° C. to 175° C., for example. Specifically, in certain embodiments, the fluid may exit the second heat exchanger 144 at approximately 90° C. In the embodiment illustrated in FIG. 3, the fluid flows through both the first and second heat exchangers 142 and 144. However, in other embodiments, a first fluid may flow through the first heat exchanger 142, and a second fluid may flow through the second heat exchanger 144. In such an embodiment, the heated first and second fluids may be used for separate vapor absorption machines.

As may be appreciated, the first portion 42 and the second portion 44 may be coupled together generally perpendicular to each other as illustrated. In such a configuration, the heat recovery system 140 may use the first heat exchanger 142 and the second heat exchanger 144 in order to transfer heat from the producer gas flowing through both portions 42 and 44. However, in certain embodiments, one heat exchanger may be positioned within the first and second portions 42 and 44.

The first and second heat exchangers 142 and 144 may be any type of heat exchanger, such as a tubular heat exchanger, coiled heat exchanger, jacketed heat exchanger, shell and tube heat exchanger, plate heat exchanger, or plate fin heat exchanger, for example. In certain embodiments where the biomass gasification system 10 produces megawatts of power, the producer gas may be cooled in the outlet 26 (i.e., by the first and second heat exchangers 142 and 144) from a temperature of approximately 450° C. to a temperature of 200° C. Such a system may capture approximately 0.5 gigajoules (GJ) to 0.75 GJ, 0.6 GJ to 1.2 GJ, or 0.25 GJ to 0.7 GJ of energy per hour by using the first and second heat exchangers 142 and 144. Specifically, in certain embodiments, the system may capture approximately 1.0 GJ of energy per hour by using the first and second heat exchangers 142 and 144. In addition, because heat is transferred from the producer gas to the fluid flowing through the first and second heat exchangers 142 and 144, the energy required to cool the producer gas may be significantly reduced. For example, the chilled water scrubber 68 illustrated in FIG. 1 may utilize a decreased amount of energy to cool the producer gas.

In certain embodiments, a tube 146 connects the first heat exchanger 142 to the second heat exchanger 144 to enable the fluid to flow from the first heat exchanger 142 to the second heat exchanger 144. Further, in certain embodiments, a tube 148 connects the second heat exchanger 144 to a vapor absorption machine 150 to enable the heated fluid to flow from the second heat exchanger 144 to the vapor absorption machine 150. The vapor absorption machine 150 uses the heated fluid (e.g., hot water or steam) to generate cooling, such as for air conditioning, refrigeration, cooling water, cooling a solvent, or other types of chilling. Specifically, the vapor absorption machine 150 uses a vapor absorption cycle.

In certain embodiments, the vapor absorption cycle includes a condenser, an expansion valve, an evaporator, and an absorber. In the condenser, a high pressure and high temperature refrigerant is condensed, such as by using cool water. For example, the refrigerant may be ammonia, methane, butane, or ethylene, among others. The condensed refrigerant then passes through the expansion valve where the pressure and the temperature of the refrigerant are reduced. The low pressure and low temperature refrigerant enters the evaporator where the refrigerant evaporates and transfers heat with a cooling medium that can be used for refrigeration. The refrigerant then flows to the absorber where the refrigerant mixes with an absorbent, such as water, and compression results. The combined absorbent and refrigerant mixture exchanges heat with the heated fluid. Heat is transferred from the heated fluid to the mixture, thereby causing the refrigerant to evaporate out of the mixture at a high pressure and high temperature. The high pressure and high temperature refrigerant repeats the cycle by returning to the condenser.

Using the heated fluid as described above, the vapor absorption machine 150 may produce approximately 50 kW to 100 kW, 60 kW to 120 kW, or 40 kW to 70 kW of energy. Specifically, in certain embodiments, the vapor absorption machine 150 may produce approximately 100 kW of energy. With refrigeration being produced by the vapor absorption machine 150, the amount of energy used by the biomass gasification plant, such as for producing chilled water or a chilled solvent, may be decreased. For example, the amount of energy used by a biomass gasification plant may be decreased by approximately 2 to 4 percent, 3 to 5 percent, or 1 to 3 percent. Specifically, in certain embodiments, the amount of energy used by a biomass gasification plant may be decreased by approximately 4 percent.

In certain embodiments, a tube 152 connects the vapor absorption machine 150 to a hot water tank 154. The hot water tank 154 is used to store the fluid that exits the vapor absorption machine 150 through the tube 152. In addition, a tube 156 connects the hot water tank 154 to a pump 158. The pump 158 pumps the fluid from the hot water tank 154 such that the fluid can cycle through the system 140. A tube 160 connects the pump 158 to the first heat exchanger 142. The tubes 146, 148, 152, 156, and 160 may be any type of tube that enables the fluid to flow through the system 140 and enables the fluid to hold its temperature. For example, in certain embodiments, the tubes 146, 148, 152, 156, and 160 may be insulated, such as with insulation surrounding the tubes.

In summary, the system 140 as described may operate to exchange heat from the producer gas with the fluid to produce energy. The following description provides a summary of the heat recovery system. Specifically, the fluid, such as water, flows from the tube 160 into the first heat exchanger 142 where the fluid exchanges heat with the producer gas flowing through the first portion 42 of the outlet 26. More specifically, the fluid is heated, while the producer gas is cooled. The fluid then flows through the tube 146 to the second heat exchanger 144 where the fluid again exchanges heat, this time with the producer gas flowing through the second portion 44 of the outlet 26. More specifically, the fluid is further heated, while the producer gas is further cooled. The fluid then flows through the tube 148 to the vapor absorption machine 150, which transfers heat from the heated fluid in order to generate cooling. The cooled fluid then exits the vapor absorption machine 150 by flowing through the tube 152. The fluid flows into the hot water tank 154, where it is stored until the pump 158 pumps the fluid through the tube 156, then pumps the fluid back into the tube 160 where the fluid is cycled through the system 140 again.

Although the heated fluid in this embodiment is used to operate the vapor absorption machine 150, the heated fluid (e.g., hot water or steam) may be used differently in certain embodiments. For example, in certain embodiments, steam may be produced in the first and second heat exchangers 142 and 144 to provide heat for drying the biomass, ammonia removal in an ammonia removal unit, and so forth. The system 140 as described may produce steam at a pressure of approximately 2 bar to 3 bar, 3 bar to 5 bar, or 1 bar to 4 bar. Specifically, in certain embodiments, the system 140 may produce steam at a pressure of approximately 4 bar. Furthermore, the system 140 may produce approximately 200 kg to 400 kg, 300 kg to 500 kg, or 150 kg to 350 kg of steam per hour. Specifically, in certain embodiments, the system 140 may produce approximately 325 kg of steam per hour.

Figure 4:
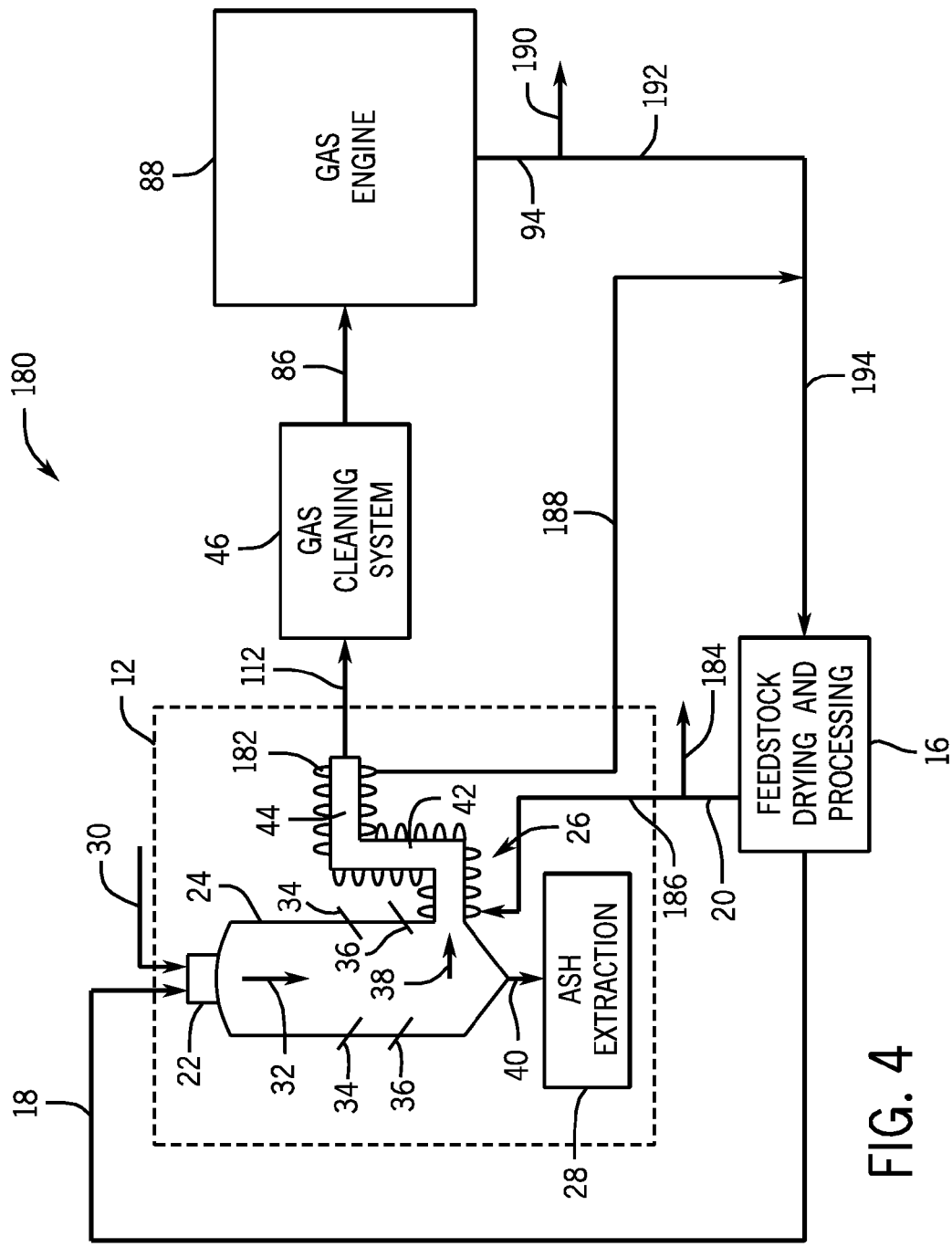
FIG. 4 is a schematic block diagram of an embodiment of a biomass gasifier with a heat recovery system coupled to an outlet of the biomass gasifier of FIG. 1.

FIG. 4 is a schematic block diagram of an embodiment of a biomass gasifier 12 with a heat recovery system 180 coupled to an outlet 26 of the biomass gasifier 12 of FIG. 1. As described above with respect to FIG. 1, the biomass gasifier 12 combusts the feedstock 18 with air 30 to create producer gas that flows out of the biomass gasifier 12 through the outlet 26. The byproduct hot ash is extracted from the reactor 24 by the ash extraction system 28. The producer gas exits the biomass gasifier 12 as illustrated by arrow 112 and flows into the gas cleaning system 46. After the producer gas is cleaned, the producer gas flows into the gas engine 88.

In the embodiment illustrated in FIG. 4, the outlet 26 of the gasifier 12 includes a limpet coil 182 surrounding the first and second portions 42 and 44 of the outlet 26. The limpet coil 182 is a coiled pipe or tubing, which is coupled on the external surface of the first and second portions 42 and 44. Furthermore, the limpet coil 182 may be manufactured using materials, such as metals, including stainless steel, aluminum, aluminum alloys, other alloys, and so forth. The limpet coil 182 may be welded to the outlet 26, or bonded in any suitable manner. In certain embodiments, the limpet coil 182 may also include a jacket. The limpet coil 182 acts as a heat exchanger and enables a fluid to flow through its coil to exchange heat with the producer gas. The fluid flowing through the limpet coil 182 may be any fluid, such as dryer exhaust gas. Specifically, in certain embodiments, the feedstock drying and processing system 16 produces the dryer exhaust 20. The dryer exhaust 20 exits the feedstock drying and processing system 16 as illustrated, and in certain embodiments may flow to a chimney as indicated by arrow 184. When the dryer exhaust 20 exits the feedstock drying and processing system 16, the dryer exhaust 20 may be at a temperature in a range of approximately 40° C. to 60° C., 50° C. to 75° C., or 30° C. to 55° C. Specifically, in certain embodiments, the dryer exhaust 20 may be approximately 45° C.

In addition to flowing through the chimney, the dryer exhaust 20 may flow to the limpet coil 182 through a tube 186. The dryer exhaust 20 flows through the limpet coil 182 and exchanges heat with the producer gas flowing through the first and second portions 42 and 44 of the outlet 26. When the dryer exhaust 20 flows out of the limpet coil 182, the dryer exhaust 20 may be at a temperature in a range of approximately 80° C. to 100° C., 90° C. to 120° C., 85° C. to 110° C. Specifically, in certain embodiments, the dryer exhaust 20 may exit the limpet coil 182 at approximately 85° C. The heated dryer exhaust 20 then flows through a tube 188 to just upstream of the feedstock drying and processing system 16.

Furthermore, in certain embodiments, the gas engine exhaust 94 may flow to multiple locations. Specifically, some of the gas engine exhaust 94 may flow, as depicted by arrow 190, to a system such as a vapor absorption machine, a waste water treatment plant (e.g., for stripping ammonia), and so forth, where the gas engine exhaust 94 may be used as a source of energy. The gas engine exhaust 94 may be at a temperature in a range of approximately 400° C. to 450° C., 425° C. to 475° C., or 375° C. to 425° C. when it exits the gas engine 88. Specifically, in certain embodiments, the gas engine exhaust 94 may be approximately 425° C. when it exits the gas engine 88. Some of the gas engine exhaust 94 may flow through a tube 192 toward the feedstock drying and processing system 16.

However, a temperature such as approximately 425° C. may be too hot to be used directly in the feedstock drying and processing system 16. Therefore, in certain embodiments, the heated dryer exhaust 20 from the tube 188 combines with the gas engine exhaust 94 from the tube 192 into the tube 194. The combined exhaust then enters the feedstock drying and processing system 16. As such, the combined mixture of the heated dryer exhaust 20 and the gas engine exhaust 94 provide heat for drying feedstock at temperatures high enough to dry the feedstock, but low enough that the feedstock is not burned during the drying process. For example, the combined mixture of the heated dryer exhaust 20 and the gas engine exhaust 94 may be at a temperature in a range of approximately 110° C. to 135° C., 100° C. to 120° C., or 115° C. to 150° C. when it enters the feedstock drying and processing system 16. Specifically, in certain embodiments, the combined mixture of the heated dryer exhaust 20 and the gas engine exhaust 94 may be approximately 110° C. when it enters the feedstock drying and processing system 16.

Such a system may limit the presence of excessive heat in the feedstock drying and processing system 16. Furthermore, by recycling the dryer exhaust gas 20, lower emissions may be produced. Although the limpet coil 182 is used in the embodiment illustrated in FIG. 4, other embodiments may use other heat exchangers that wrap around the outlet 26, or are internal to the outlet 26. In addition, although the dryer and engine exhaust are used for drying feedstock, in certain embodiments, the exhaust may be used to produce refrigeration, such as with a vapor absorption cycle.

In certain embodiments, the heat recovery systems 110, 140, and 180 described above with respect to FIGS. 2, 3, and 4 may be combined. For example, the heat recovery system 110 may be combined with the heat recovery system 140 or the heat recovery system 180. In other embodiments, the heat recovery system 140 may be combined with the heat recovery system 180. Furthermore, in certain embodiments, the heat recovery system 110 may be combined with the heat recovery system 140 and the heat recovery system 180. In such systems, heat from multiple heat recovery systems may be combined together for a single purpose, or used for different purposes.

The heated water, steam, or gas produced using the heat recovery systems 110, 140, and 180 may be used in any number of applications. For example, in certain embodiments of the heat recovery system 110, 140, and 180, the heated water, steam, or gas may be used for driving a steam turbine to produce electrical power, heating purposes such as feed heating, driving a mechanical device, ammonia stripping, water treatment, a vapor absorption machine, moderation, vacuum creation, and/or any other suitable purpose. By using heat from a gasification system that would otherwise go unused, efficiency may be improved. Furthermore, the energy produced may be used to decrease overall system energy consumption, or to power another system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gasification system, comprising:
   a gasifier having an inlet section configured to receive a biomass feedstock and air, a reactor section configured to gasify a mixture of the biomass feedstock and the air to generate a producer gas, and an outlet section configured to output the producer gas from the reactor section;
   a heat exchanger system coupled to the outlet section of the gasifier, wherein the heat exchanger system is configured to recover heat from the gasifier by transferring heat to a fluid to create a heated fluid;
   a dryer configured to dry the biomass feedstock prior to delivery into the gasifier, wherein the fluid comprises a dryer exhaust from the dryer, and the heat exchanger system is configured to heat the dryer exhaust to create a heated dryer exhaust; and
   a gas engine configured to combust the producer gas from the gasifier to produce energy, wherein the gasification system is configured to mix the heated dryer exhaust with an engine exhaust from the gas engine to create an exhaust mixture of the heated dryer exhaust and the engine exhaust, and to reduce a temperature of the engine exhaust.

2. The gasification system of claim 1, wherein the heat exchanger system comprises a first heat exchanger coupled to an upstream section of the outlet section, and a second heat exchanger coupled to a downstream section of the outlet section, wherein the gasification system is configured to flow the fluid through both the first and second heat exchangers.

3. The gasification system of claim 1, wherein the heat exchanger system is configured to transfer heat to the fluid to generate steam directed to an ammonia removal unit.

4. The gasification system of claim 1, wherein the gasification system is configured to deliver the exhaust mixture to the dryer for use in drying the biomass feedstock.

5. The gasification system of claim 1, wherein the heat exchanger system comprises a limpet coil.

6. A gasification system, comprising:
   a gasifier having an inlet section configured to receive a biomass feedstock and air, a reactor section configured to gasify a mixture of the biomass feedstock and the air to generate a producer gas, and an outlet section configured to output the producer gas from the reactor section;
   a heat exchanger system coupled to the gasifier, wherein the heat exchanger system is configured to recover heat from the gasifier by transferring heat to a fluid to create a heated fluid, and wherein the heat exchanger system is coupled to the outlet section of the gasifier;
   a vapor absorption machine coupled to the heat exchanger system, wherein the vapor absorption machine is configured to use the heated fluid to refrigerate a medium;
   a dryer configured to dry the biomass feedstock prior to delivery into the gasifier, wherein the fluid comprises a dryer exhaust from the dryer, and the heat exchanger system is configured to heat the dryer exhaust to create a heated dryer exhaust; and
   a gas engine configured to combust the producer gas from the gasifier to produce energy, wherein the gasification system is configured to mix the heated dryer exhaust with an engine exhaust from the gas engine to create an exhaust mixture of the heated dryer exhaust and the engine exhaust, and to reduce a temperature of the engine exhaust.

7. The gasification system of claim 6, wherein the heat exchanger system comprises a first heat exchanger coupled to an upstream section of the outlet section, and a second heat exchanger coupled to a downstream section of the outlet section, wherein the gasification system is configured to flow the fluid through both the first and second heat exchangers.

8. The gasification system of claim 6, wherein the heat exchanger system is configured to transfer heat to the fluid to generate steam directed to an ammonia removal unit.

9. The gasification system of claim 6, wherein the heated fluid from the heat exchanger system is used by a steam turbine to generate power.

10. The gasification system of claim 6, wherein the gasification system is configured to deliver the exhaust mixture to the dryer for use in drying the biomass feedstock.

11. The gasification system of claim 6, wherein the heat exchanger system comprises a limpet coil.

12. The gasification system of claim 6, wherein the heat exchanger system is coupled to an ash extraction system of the gasifier, the ash extraction system is configured to receive hot ash from the reactor section, and the heat exchanger system is configured to transfer heat from the hot ash in the ash extraction system to the fluid.

* * * * *